United States Patent [19]
Matsuura

[11] Patent Number: 5,088,044
[45] Date of Patent: Feb. 11, 1992

[54] KNOCKING DETECTION DEVICE FOR AN AUTOMOTIVE ENGINE

[75] Inventor: Takashi Matsuura, Tokyo, Japan

[73] Assignee: Fuji Jukogyo Kabushiki Kaisha, Tokyo, Japan

[21] Appl. No.: 508,571

[22] Filed: Apr. 13, 1990

[30] Foreign Application Priority Data

Apr. 14, 1989 [JP] Japan .................................... 1-95690

[51] Int. Cl.$^5$ ................................................ F02P 5/14
[52] U.S. Cl. ............................... 364/431.08; 123/425; 73/35
[58] Field of Search ............... 123/416, 417, 425, 435; 364/431.08; 73/35 KR, 35 K, 35 KS, 35 L, 35 O, 35 P

[56] References Cited

U.S. PATENT DOCUMENTS

| | | | |
|---|---|---|---|
| 4,271,469 | 6/1981 | Kawai et al. | 364/431.08 |
| 4,675,821 | 6/1987 | Aoki et al. | 364/431.08 |
| 4,699,106 | 10/1987 | Haraguchi et al. | 123/435 |
| 4,750,103 | 6/1988 | Abo et al. | 123/425 |
| 4,770,143 | 9/1988 | Takahashi | 123/425 |
| 4,770,144 | 9/1988 | Sakakibara et al. | 73/351 K |
| 4,903,210 | 2/1990 | Akasu | 364/431.08 |

*Primary Examiner*—Salvatore Cangialosi
*Attorney, Agent, or Firm*—Beveridge, DeGrandi & Weilacher

[57] ABSTRACT

There is disclosed a knocking detection device for an automotive engine mounted on a vehicle and having a knock sensor for detecting analog vibration waveforms of the engine, and a crank position sensor for producing signals corresponding to a predetermined crank angle of the engine. The device comprises a first calculating circuit responsive to the signals from the crank position sensor for calculating an engine speed of the engine; a first setting circuit for setting a knocking detection term in one cycle of the engine corresponding to a period having the possibility of knocking; a conversion circuit for converting analog waveforms detected by the knock sensor into digital data every sampling period; a second calculating circuit for calculating a knocking level of the engine based on an average value of the digital data from the conversion circuit during the knocking detection term set by the first setting circuit; a second setting circuit responsive to the engine speed calculated by the first calculating circuit for setting a discrimination level; and a determination circuit for determining an occurrence of knocking by comparing the knocking level output from the second calculating circuit with the discrimination level set by the second setting circuit.

5 Claims, 5 Drawing Sheets

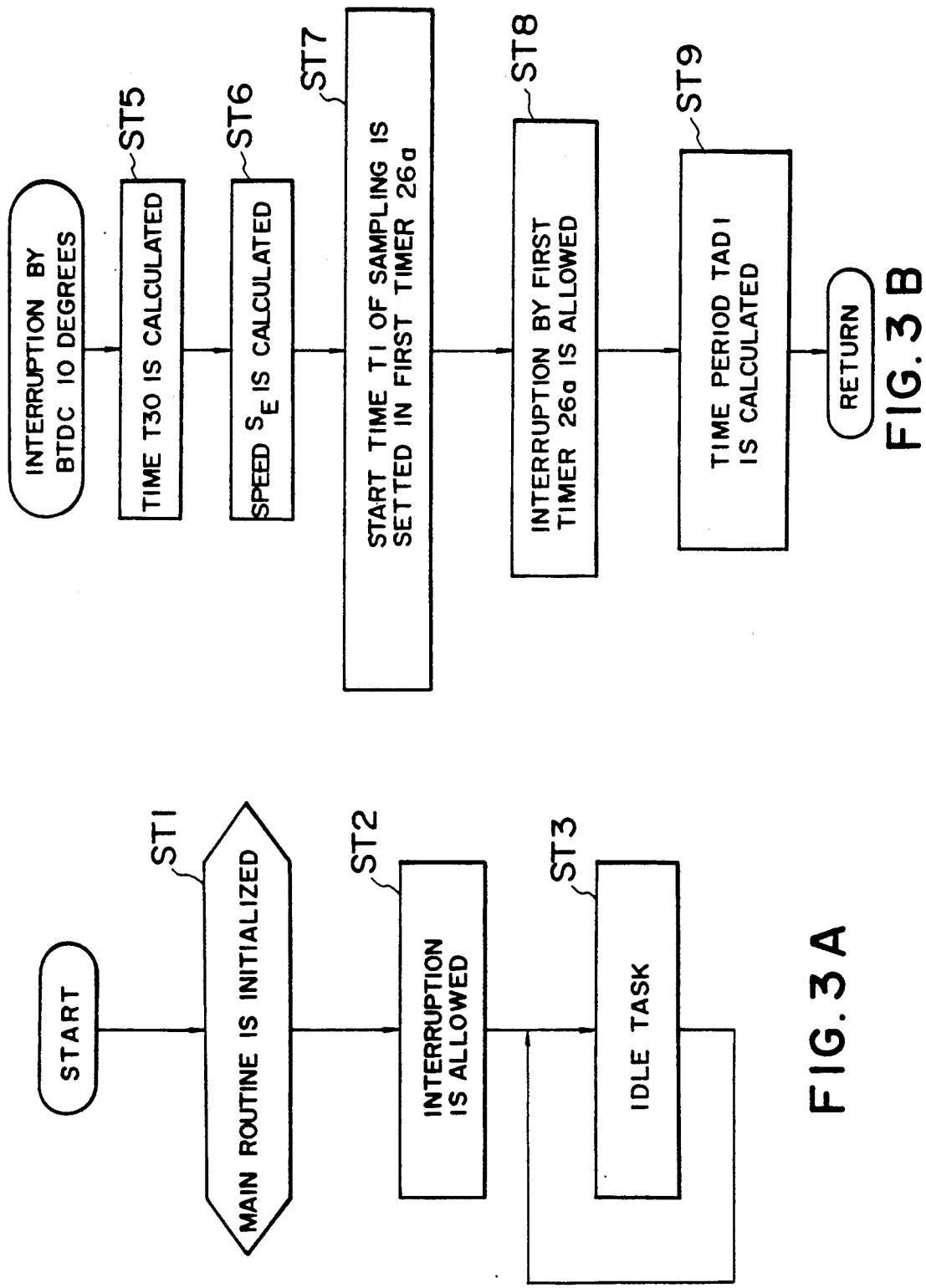

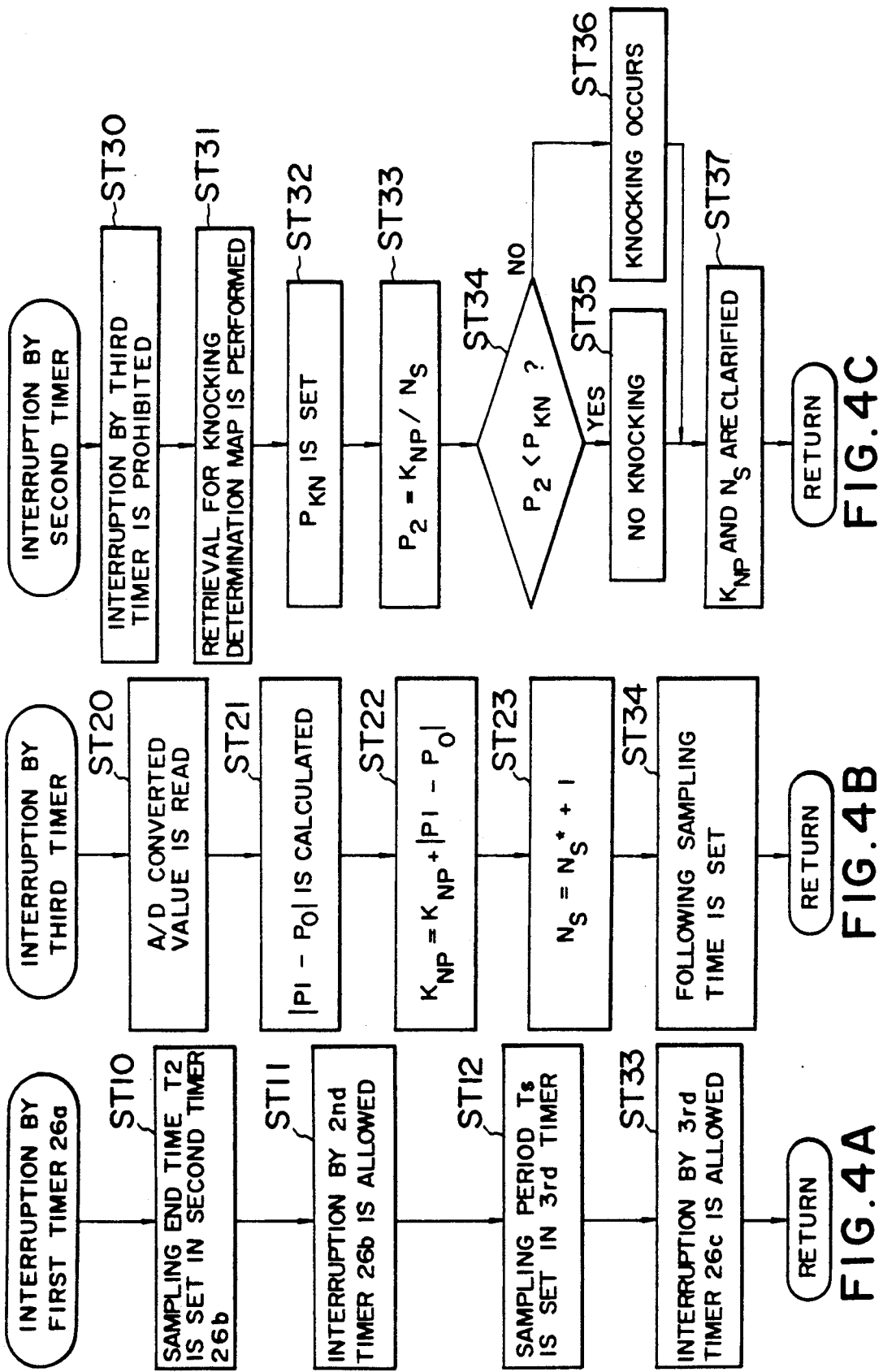

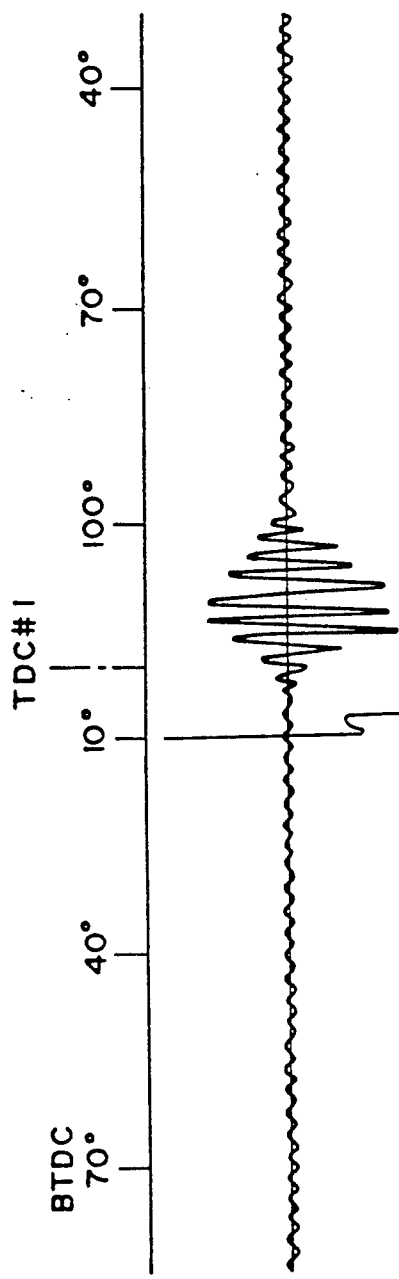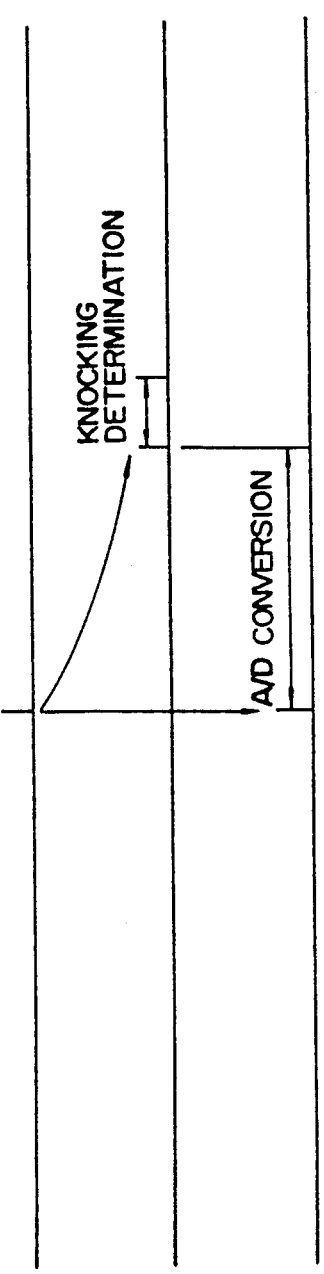

KNOCKING DETECTION DEVICE FOR AN AUTOMOTIVE ENGINE

BACKGROUND OF THE INVENTION

The present invention relates to a knocking detection device for detecting knocking of an engine mounted on a vehicle by directly converting an output of a knock sensor from an analog waveform to digital data.

A recent vehicle has a knocking controller with a knock sensor for detecting the knocking in dependency on abnormal combustion of the automotive engine to prevent the knocking by controlling an ignition timing. The controller is capable of controlling the ignition timing at a knocking limit, so that it is possible to improve power performance of the engine.

The knock sensor is provided at a suitable place to detect pressure vibration in a combustion chamber due to abnormal combustion or mechanical vibration transmitted from the combustion chamber to the cylinder block of the engine.

The determination for occurrence of knocking is disclosed in Japanese Patent Application Laid-open No. 58-30477 (1983) and No. 61-8472 (1986). Namely, a conventional knocking detection device comprises a knock sensor, a filter circuit for selecting a knocking component by limiting a frequency band of signals from the sensor, a peak hold circuit for holding a peak value of signal waveforms, and an analog/digital converter for converting the peak value from analog signal to digital signal. A microcomputer calculates an average value of a plurality of peak values from the converted digital signals and determines whether the knocking occurs or not by comparing the average value with a predetermined value of a knocking determining level.

However, analog circuits such as the filter circuit and the peak hold circuit in the conventional device use elements such as resistors and capacitors respectively having allowance, so that it is impossible to avoid an error in dependency on a circuit constant. Every element is selected to set the circuit constant properly, which has many production steps. Many steps and elements used in the analog circuits increase the production cost.

Furthermore, the elements deteriorate with lapse of time and the circuit characteristics change. Accordingly, the reliability of the analog circuits decreases.

Accordingly, if the occurrence of the knocking is determined by processing the signals from the knock sensor without the analog circuit, high-speed processing is required to precisely convert the vibration waveform into digital data. The conventional device has the problem of increasing the electric load while processing the knocking detection.

SUMMARY OF THE INVENTION

An object of the present invention is to provide a knocking detection device for an automotive engine, which is capable of processing an output waveform of a knock sensor at high-speed without an analog circuit, and which is capable of being constructed at a low cost with few parts.

The knocking detection device according to the present invention comprises an analog/digital conversion circuit for directly converting a vibration signal from a knock sensor during a knocking detection term into digital data at every sampling period having the possibility of reproduction of the vibration signal, a circuit for setting a knocking discrimination level in dependency on an engine speed, a calculating circuit for calculating a knocking level based on an average value of the digital data, and a knocking determination circuit for determining the presence or absence of knocking by comparing the knocking level during the knocking detection term with the knocking discrimination level set by the setting circuit.

BRIEF DESCRIPTION OF THE DRAWINGS

FIGS. 3A and 3B and 4A and 4B are flow charts showing a knocking detection procedure of the device; and FIGS. 5(a) through 5(e) are timing charts showing the knocking detection of the device.

DETAILED DESCRIPTION OF THE PREFERRED EMBODIMENTS

There will be described preferred embodiments of a knocking detection device according to the present invention with reference to the accompanying drawings.

Figure 1:
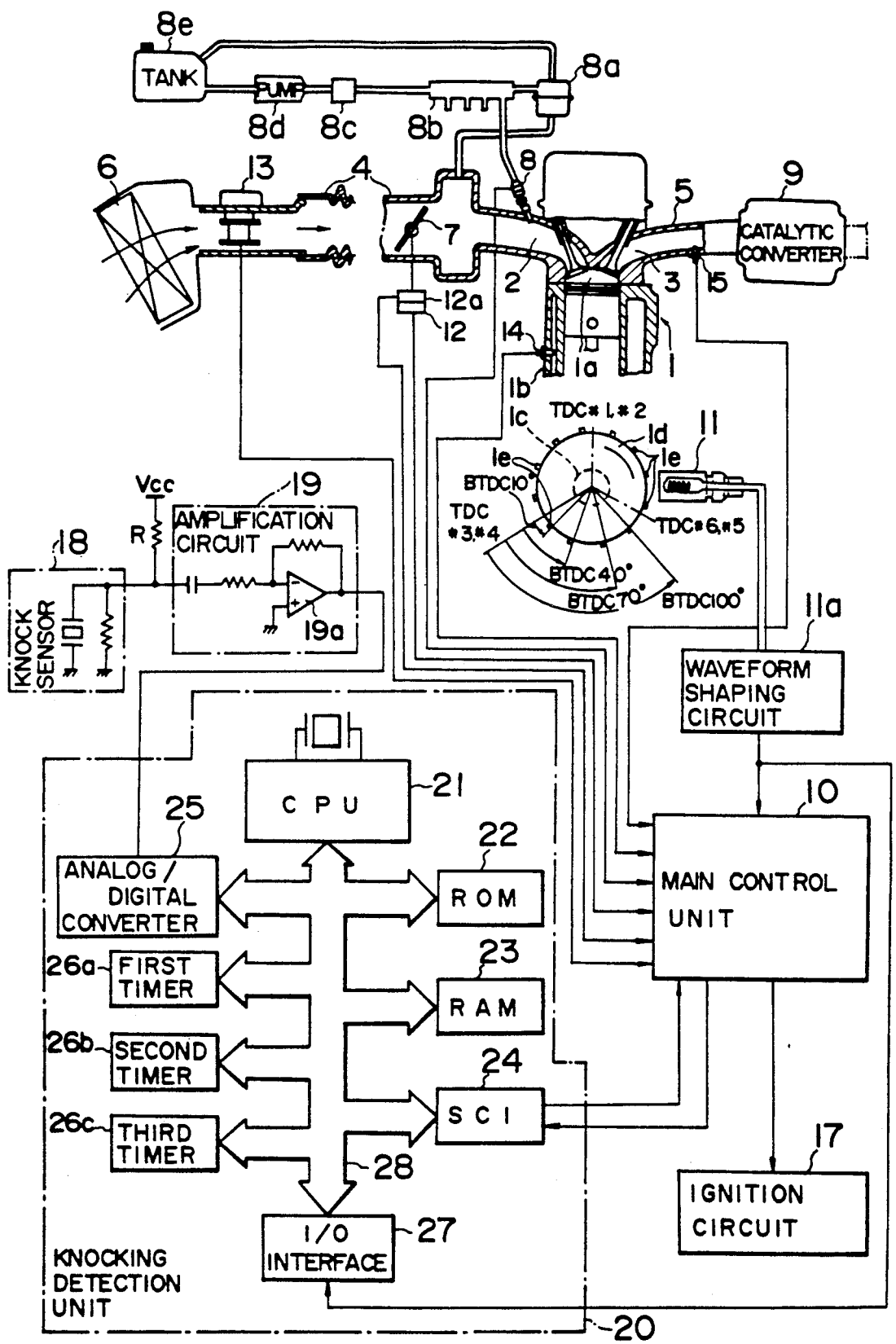
FIG. 1 is a circuit diagram schematically showing a knocking detection device according to the present invention.

FIG. 1 schematically shows an engine control system and a knocking detection device according to the present invention. In the figure, an engine 1 has a combustion chamber 1a, a coolant passage 1b, a crank shaft 1c, and a crank rotor 1d. In each cylinder, the combustion chamber 1a has an intake port 2 communicated with an intake pipe 4, and an exhaust port 3 communicated with an exhaust pipe 5. An air cleaner 6 is communicated with an upstream side of the intake pipe 4. The pipe 4 has a throttle valve 7 at an intermediate position thereof. An injector 8 is disposed at each intake port 2. A fuel injection system comprises the injector 8, a pressure regulator 8a, a delivery pipe 8b, a fuel filter 8c, a fuel pump 8d, and a fuel tank 8e. A catalytic converter 9 is provided in the exhaust pipe 5.

Moreover, the crank rotor 1d is fixedly provided around the crank shaft 1c. A crank position sensor 11 is provided against the outer surface of the rotor 1d. A throttle position sensor 12 is provided at the throttle valve 7 for detecting an opening degree of the throttle valve 7. An idle switch 12a cooperating with the throttle position sensor 12 detects an idling state of the engine. The intake pipe 4 has an intake air quantity sensor 13 on the downstream side of the air cleaner 6. A coolant thermosensor 14 is exposed in the coolant passage 1b of the engine 1, and an exhaust gas sensor such as an oxygen sensor 15 is exposed in the exhaust pipe 5 at the upstream side of the catalytic converter 9.

A main control unit 10 receives several outputs from the throttle sensor 12, the idle switch 12a, the intake air sensor 13, the coolant thermosensor 14 and, the oxygen sensor 15. The unit 10 is constructed, for example, as a microcomputer. Furthermore, the unit 10 receives an output from the crank position sensor 11 through a waveform shaping circuit 11a, and is connected with an ignition circuit 17 as an actuator driving circuit.

The unit 10 is also connected to an auxiliary knocking detection unit 20. The detection unit 20 is connected with the crank position sensor 11 through the shaping circuit 11a, and is also connected with a knock sensor 18 through an amplification circuit 19.

The detection unit 20 comprises a central processing unit (abbreviated to CPU hereafter) 21, a read only memory (ROM) 22, a random access memory (RAM) 23, a serial control interface (SCI) 24, an analog/digital (A/D) converter 25, first to third timers 26a to 26c, an input/output (I/O) interface 27, and a bus line 28 for connecting them each other. The waveform shaping circuit 11a is connected through the I/O interface 27, the main control unit 10 is connected through the SCI 24, and the amplification circuit 19 of the knock sensor 18 is connected through the A/D converter 25.

The crank position sensor 11 is constructed by an electromagnetic pickup detecting projections 1e (or slits) formed on the rotor 1d. A magnetic flux changes when the projections 1e approach and are alienated to and from sensor in accordance with the rotation of the rotor 1d. The sensor 11 generates an aleternating current in dependency on the magnetic flux change and the wave shaping circuit 11a convertes the alternating current into pulses as crank angle signals.

In the case of a six cylinder engine which has the top dead centers (TDC) of cylinders every 120 degrees, for example, the wave shaping circuit 11a outputs the crank angle signals at every 30 degrees from 10 degrees before the top dead center (BTDC). That is, the crank angle signals at BTDC 10, 40, 70 and 100 degrees are supplied to the main control unit 10 to calculate the iginition timing and the like. An iginition timing signal is output to the iginition circuit at a calculated iginition timing with reference to the crank angle signal of every 30 degrees.

Furthermore, the sensor 11 outputs signals of every 120 degrees representing BTDC 10 degrees to the knocking detection unit 20 to start interruption processing.

The knock sensor 18 is connected with a constant current power supply $V_{CC}$ via a resistor R and constructed, for example, by a resonance type knock sensor having an oscillator which has a natural frequency being substantially the same as a vibration by knocking, and a piezoresistive element for converting a vibrational acceleration detected by the oscillator into electrical signals. The sensor 18 detects the vibration propagated in a cylinder block of the engine in dependency on a combustion pressure at a compression (firing) stroke, and outputs an analog vibration waveform as electrical signals.

The analog waveform signals are converted into digital data by the converter 25 of the unit 20 after the circuit 19 amplifies the signals to a predetermined level. At the A/D conversion, a high-speed sampling is performed in order to pricisely convert the vibration waveforms.

The CPU 21 starts an internal interruption processing by the first to third timers 26a to 26c in dependency on the signals from the crank sensor 11 to execute a program stored in the ROM 22 for the knocking detection. Namely, the CPU 21 retrieves a discrimination level MAP (abbreviated to $MP_{KN}$ hereafter and shown by numeral 36 in FIG. 2) and sets a discrimination level in direct or by a interpolational calculation. On the other hand, the A/D converter 25 converts the signals from the knock sensor 18 during a knocking detection term to calculate a knocking level. The CPU 21 determines whether or not the knocking occurs by comparing the knocking level with the discriminating level to transmit a discriminated result to the main control unit 10 through the SCI 24.

When the detection unit 20 outputs a signal representing the occurrence of knocking, the main unit 10 immediately delays an ignition timing of the corresponding cylinder to avoid knocking.

Figure 2:
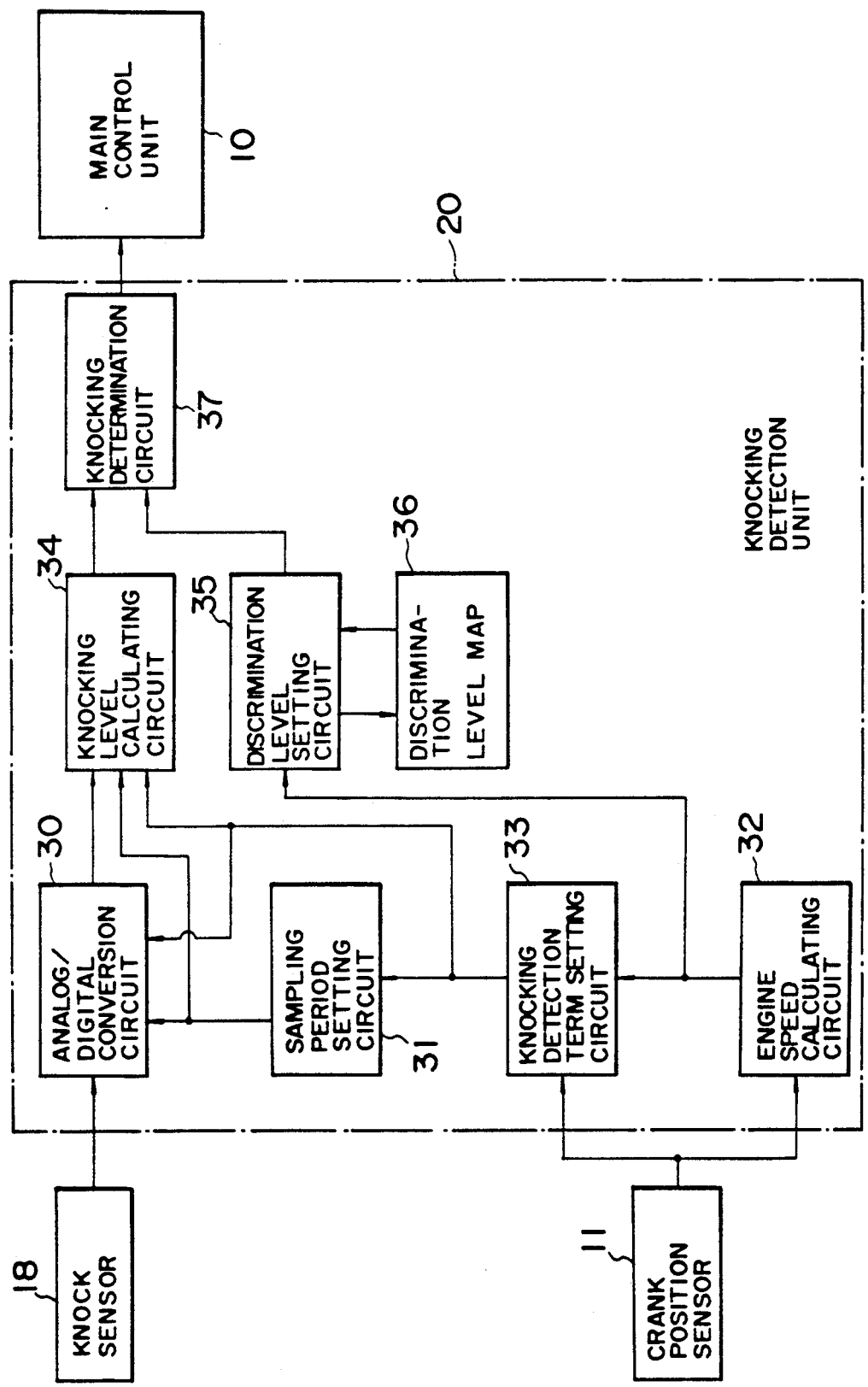
FIG. 2 is a block diagram showing a function of the present invention.

Next, there will be described a functional constitution of the detection unit 20 with reference to FIG. 2. The detection unit 20 comprises an A/D conversion circuit 30 (converter 25), a sampling period setting circuit 31, an engine speed calculating circuit 32, a knocking detection term setting circuit 33, a knocking level calculating circuit 34, a discrimination level setting circuit 35, the discrimination level map ($MAP_{KN}$) 36, and a knocking determining circuit 37. The unit 20 exclusively processes the knocking detection procedure at high-speed.

The conversion circuit 30 converts the analog signals from the knock sensor 18 into the digital data by the converter 25 every sampling period set by the setting circuit 31 during the knocking detection term set by the setting circuit 33.

The period setting circuit 31 sets the sampling period for the A/D conversion in the circuit 30 during the detection term set by the circuit 33 to output the sampling period to the conversion circuit 30 and the knocking level calculating circuit 34. The sampling period is set in the third timer 26c to a period $T_S$ to reproduce the vibration waveforms with fidelity, such as 30 micro seconds.

The engine speed calculating circuit 32 detects lapsed time corresponding to 30 degrees of the crank angle in dependency on the signals from the crank sensor and calculates an engine speed $S_E$.

The term setting circuit 33 sets the knocking detection term corresponding to a period in which the knocking may occur. Since the knocking occurrence range moves in the crank angle depending on the engine speed, a start time and an end time of the term may be changed responsive to the engine speed $S_E$ calculated by the circuit 32. On the other hand, the term may be fixed at a predetermined wide crank angle range, in which all of the knockings arise. The term is, therefore, set on the basis of the experiment. Furthermore, the circuit 33 outputs detection term signals to the conversion circuit 30, the period setting circuit 31, and the knocking level calculating circuit 34.

The knocking detection term is set by the predetermined map directly or by the interpolatinal calculation corresponding to the engine speed $S_E$, thereby setting a start time T1S of the knocking detection term in the first timer 26a and an end time T1E of the term in the second timer 26b.

The knocking level calculating circuit 34 subtracts an intermediate value P0 of an amplitude of the vibration waveform from the digital data Pi at every sampling timing during the knocking detection term. Resulting values at every sampling timing are integrated. An average value P2 is calculated by dividing the integrated value by a sampling number $N_S$ after the A/D conversion during the knocking detection term. Thus, the average value P2 during the detection term is calculated by the following equation to output it as a knocking level to the circuit 37.

$$P2 = 1/N_S \Sigma |Pi - P0|$$

The discrimination level setting circuit 35 retrieves $MAP_{KN}$ 36 using the engine speed $S_E$ as a parameter to set the discrimination level in direct or by the interpolational calculation, thereby outputting the level to the determining circuit 37.

The determination levels $P_{KN}$ in the map $MAP_{KN}$ 36 may be decided based on an average value of the output of the knock sensor 18 during no knocking period. Thus, the discrimination levels depending on the engine speed $S_E$ is calculated by adding the average value with a predetermined offset value. As it is possible to eliminate the calculation of the determination level $P_{KN}$ during no knocking period, the processing speed is thereby improved.

The determining circuit 37 compares the knocking level P2 calculated by the calculating circuit 34 with the determination level $P_{KN}$ by the setting circuit 35. When $P2 < P_{KN}$, the circuit 37 determines no knocking in the engine. When $P2 \geq P_{KN}$, the circuit 37 determines the knocking occurrence to transmit the knocking determination signal to the main control unit 10 through the SCI 24.

There will be described the setting procesure of the knocking detection level hereinunder.

The above-described processing is executed by the internal interrupting processing by the first to third timers 26a to 26c as shown in FIG. 5(c) to 5(e). First, the knocking detection unit 20 is initialized in an interruptive vector, various flags, and register in a step ST1 of a main routine as shown in FIG. 3A.

Secondly, the procedure advances in a step ST2, the CPU 21 allows to be interrupted at every 30 CA degrees corresponding to the signals from the crank sensor 11, to therefore execute an idle task in a step ST3. At this time, the CPU 21 enters the stand-by condition to execute the knocking detection processing when the interruption occurs.

Next, when the sensor 11 outputs the signal of BTDC 10CA degrees to the CPU 21 as shown in FIG. 5(a), the CPU 21 starts an external interruption processing to calculate a lapsed time T30 corresponding to 30 degrees of the crank angle in a step ST5, as shown in FIG. 3B. The lapsed time T30 is a time between signals from the crank sensor 11 supplied with every 30 CA degrees.

Advanced to a step ST6, the engine speed $S_E$ is calculated in dependency on the time T30 calculated in the step ST5 to continue in a step ST7.

In the step ST7, the start time T1S of the knocking detection term, that is, the start time T1S for converting the signals from the knock sensor 18, as shown in FIG. 5(b), into the digital data, is set in the first timer 26a in dependency on the engine speed $S_E$ calculated in the step ST6. Operation then continues to a step ST8.

In the step ST8, the CPU 21 allows to be interrupted by the first timer 26a. Advanced to a step ST9, a time period TAD1 of the knocking detection term is calculated in dependency on the engine speed $S_E$, and the operation returns to the main routine.

Knocking Detection Procedure

When the internal interruption by the first timer 26a occurs at time T1S, an end time T1E (=T1S+TAD1) of the knocking detection term is set in the second timer 26b in a step ST10 as shown in FIG. 4A. In a step ST11, the CPU 21 allows to be interrupted by the second timer 26b.

Next, operation advanced to a step ST12. The sampling period TS for the A/D conversion is set in the third timer 26c. Furthermore, in a step ST13, the CPU 21 allows to be interrupted by the third timer 26c, and the CPU 21 ends the interruption of the first timer 26a to return the main routine.

Accordingly, after the end of the interrupt operation by the first timer 26a, the interruption by the third timer 26c immediately starts as shown in FIG. 4B. The sampling processing of the A/D converted value from the knock sensor 18 is executed every sampling period $T_S$ set in the step ST12.

In a step ST20 as shown in FIG. 4B, the digital data Pi is read out, which is converted from the analog vibration waveform of the sensor 18 by the converter 25. In a step ST21, the CPU 21 calculates a difference value between the digital data Pi and the intermediate value P0 of the amplitude of the vibration waveform, that is, a strength of the knocking "$|Pi-P0|$".

In a step ST22, the CPU 21 adds the present knocking strength to an integrated value $K_{NP}*$, which is result of the integration of the knocking strength until the previous sampling timing, to calculate the renewal integrated value $K_{NP}$ ($K_{NP} = K_{NP}* + |Pi-P0|$). Then, operation continues to a step ST23.

In the step ST23, the sampling number $N_S$ until the present time is calculated by adding "1" to the sampling number $N_S*$ of the previous sampling timing ($N_S = N_S* + 1$). In a step ST24, the following sampling timing is set in the A/D converter 25, thereby ending the routine. In the next sampling timing, the steps ST20 to ST24 are repeated again.

The sampling period $T_S$ is set at such as 30 micro seconds to digitize the vibration waveforms from the knock sensor 18 precisely.

An interruption by the second timer 26b starts when operation advances to the sampling end time T1E.

Next, as shown in FIG. 4C, in a step ST30, the CPU 21 prohibits the interruption by the third timer 26c in which the sampling for the A/D converted value is executed. In a step ST31, the $MAP_{KN}$ 36 is retrieved in dependency on the engine speed $S_E$ as a parameter. In a step ST32, the determination level $P_{KN}$ is set in direct or by the interpolational calculation.

In a step ST33, the CPU 21 calculates the average value P2 of the digital data Pi converted during the knocking detection term by an equation "$P2 = K_{NP}/N_S$" as the knocking level.

In a step ST34, the CPU 21 compares the knocking level P2 calculated in the step ST33 with the discrimination level $P_{KN}$ set in the step ST31.

If the knocking level P2 is under the discrimination level $P_{KN}$, the CPU 21 determines that the knocking does not occur in the step ST35. On the other hand, if the knocking level P2 is more than the discrimination level $P_{KN}$, operation advances in a step ST36 and the CPU 21 determines that the knocking occurs, thereby transmitting the signal representing the knocking occurrence to the main control unit 10 through the SCI 24. Then, operation continues to a step ST37.

In the step ST37, the CPU 21 clears the sampling number $N_S$ and the integrated value $K_{NP}$ of the knocking strength during the knocking detection term, thereby returning to the main routine.

According to the above-mentioned procedure, the knocking detection unit 20 adopts the vibration waveforms from the knock sensor 18 to determine whether or not knocking occurs. If knocking is determined to occur and the knocking determination signal is transmitted to the main control unit 10, the unit 10 immediately outputs the ignition signals to the ignition circuit 17 for delaying an angle in order to avoid knocking of the engine.

Though the embodiment is described to have the auxiliary knocking detection unit 20 for detecting the knocking detection, the present invention is not limited in such construction. For example, the main control unit 10 can perform the knocking detection.

Furthermore, the knock sensor is not limited to use the resonance type sensor for detecting the mechanical vibration of the engine propagated in the cylinderblock. For example, the present invention uses knock sensors for detecting the combustion pressure, or the vibration noise of the engine as the waveforms.

Still furthermore, is the case of providing the auxiliary control unit for exclusively processing the output of the knock sensor except the main control unit for controlling the ignition timing, it is possible to decrease the sampling period of the auxiliary unit regardless the main unit, so that the analog waveform output from the knock sensor may be reproduced by the sampled digital data.

As described above in detail, the knocking detection device according to the present invention comprises the knocking determining circuit for setting the knocking detection level according to the engine speed, the A/D conversion circuit for directly or interpolational converting the vibration waveforms from the knock sensor during the knocking detection term into digital data every sampling period, and the knocking determination circuit for determining whether or not the knocking occurs by comparing the discrimination level with the average value of the digital data converted by the A/D conversion circuit during the knocking detection term. Accordingly, it is possible to process the vibration waveforms from the knock sensor at high-speed and without depending upon an analog circuit.

Accordingly, the device of this invention has the improvement of the reliability of the knocking detection and the processing speed without increasing the load because the circuit elements are not influenced by changes with lapse of time and the circuit characteristics of the analog circuit.

Furthermore, the present invention need not set the circuit constant of elements in the analog circuit, thereby eliminating errors of the constant. Accordingly, this invention has many effects in that the knocking detection is precise, the number of parts of the circuit decreases, and it is possible to reduce the manufacturing costs.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A knocking detection device for an automotive engine comprising
   a knock sensor for detecting analog vibration waveforms due to knocking in said engine;
   a crank position sensor for producing a crank position signal at a predetermined crank angle of said engine;
   engine speed calculating means responsive to said crank position signal for calculating an engine speed of said engine;
   knocking detection term setting means responsive to said crank position signal and said engine speed for setting a knocking detection term in one cycle of said engine, in which term knocking may occur;
   sampling period setting means for setting a sampling period for the analog/digital conversion of said analog vibration waveforms, said sampling period being set so as to digitally reproduce said vibration waveforms with fidelity;
   conversion means for converting said vibration waveform sampled every sampling period set by said sampling period setting means into digital data during said knocking detection term set by said knocking detection term setting means;
   knocking level calculating means for calculating a knocking level of said engine based on an average value of all digital data converted by said conversion means;
   discrimination level setting means responsive to said vehicle speed for setting a discrimination level to determine the occurrence of knocking after said knocking detection term is terminated; and
   determination means for determining the occurrence of knocking by comparing said knocking level calculated by said knocking level calculating means with said discrimination level set by said discrimination level setting means.

2. The device according to claim 1, wherein said knocking detecting term setting means is adapted to vary said knocking detecting term in response to said engine speed so as to comply with the actual knocking occurrence range.

3. The device according to claim 1, wherein said discrimination level setting means includes a map which stores a plurality of discrimination levels with respect to said engine speed and is retrieved to set one of said discrimination levels as a present level.

4. The device according to claim 1 mounted on a vehicle.

5. A method for detecting knocking of an automotive engine mounted in a vehicle having a knock sensor for detecting analog vibration waveforms due to the knocking in said engine and a crank position sensor for producing a crank position signal at a predetermined crank angle of said engine, the method comprising the steps of:
   calculating an engine speed of said engine in response to said crank angle signal;
   setting a knocking detection term in one cycle of said engine in response to said crank position signal and said engine speed, in which term knocking may occur;
   setting a sampling period for the analog/digital conversion of said analog vibration waveforms, said sampling period being set so as to digitally reproduce said vibration waveforms with fidelity;
   converting said vibration waveforms sampled every sampling period into digital data during said knocking detection term;
   calculating a knocking level of said engine based on an average value of all digital data of the waveforms;
   setting a discrimination level, in response to said vehicle speed, to determine the occurrence of knocking after said knocking detection term is terminated; and
   determining the occurrence of knocking by comparing said knocking level with said discrimination level.

* * * * *